US006237707B1

(12) United States Patent
Lyke et al.

(10) Patent No.: US 6,237,707 B1
(45) Date of Patent: May 29, 2001

(54) MOTION CONTROLLING SYSTEM FOR MOTORIZED MEDICAL EQUIPMENT CARRIAGE

(75) Inventors: Daniel N. Lyke, Bridgewater, CT (US); Thomas A. Farbizio, Patterson, NY (US); Joseph Vartolone, Danbury; Nicholas W. P. Payne, New Milford, both of CT (US)

(73) Assignee: Hologic, Inc., Bedford, MA (US)

( * ) Notice: Subject to any disclaimer, the term of this patent is extended or adjusted under 35 U.S.C. 154(b) by 0 days.

(21) Appl. No.: 09/252,132

(22) Filed: Feb. 18, 1999

(51) Int. Cl.[7] .................................................. B62D 51/04
(52) U.S. Cl. ........................................ 180/19.3; 378/198
(58) Field of Search ............................... 180/19.3, 19.1, 180/19.2

(56) References Cited

U.S. PATENT DOCUMENTS

| 3,952,361 | 4/1976 | Wilkins . |
|---|---|---|
| 4,697,661 | 10/1987 | Pajerski et al. . |
| 4,829,844 | 5/1989 | Boomgaarden et al. . |
| 4,994,669 | 2/1991 | Stern . |
| 5,425,069 | 6/1995 | Pellegrino et al. . |
| 5,765,842 | 6/1998 | Phaneuf et al. . |
| 6,061,869 | * 5/2000 | Ettes et al. ........................ 15/340.2 |

FOREIGN PATENT DOCUMENTS

| 0398393 | 11/1990 | (EP) . |
| 0404437 | 12/1990 | (EP) . |

OTHER PUBLICATIONS

Texas Instruments Production Data Publication on the TSL401 Linear Sensor Array, SOES011—Mar. 1996 (8 pages).

* cited by examiner

Primary Examiner—Lanna Mai
Assistant Examiner—Andrew J. Fischer
(74) Attorney, Agent, or Firm—Ware, Fressola, Van Der Sluys & Adolphson LLP

(57) ABSTRACT

A motion controlling system for providing a motion control signal to a motor driving a wheel of a medical equipment carriage is described. The system includes a handle having an end movably supported by the carriage so as to permit movement of the handle end relative to the carriage in a direction in which movement of the apparatus is desired, The system is also provided with an optical position encoding means, coupled between the handle end and the carriage, for providing a position signal indicating the position of the handle end relative to the carriage. A motion control means, responsive to the position signal from the optical position encoding means, provides a motion control signal to the motor. Several embodiments of the optical position encoding means, which include photodiode arrays and solar cells, are described.

11 Claims, 9 Drawing Sheets

MOTION CONTROLLING SYSTEM FOR MOTORIZED MEDICAL EQUIPMENT CARRIAGE

BACKGROUND OF THE INVENTION

1. Field of the Invention

The present invention generally relates to controlling the motion of a motorized medical equipment carriage such as those typically used to transport mobile X-ray equipment. More particularly, the present invention relates to a motion controlling system for controlling the motion of a motorized medical equipment carriage having at least one motor driven wheel.

2. Description of Related Art

Mobile x-ray apparatus are used to take radiographic images of a bed-ridden patient in the patient's hospital room. Such apparatus are particularly beneficial in situations where the risks of moving the patient to stationary radiography apparatus is great. Given the inherent advantages of mobile X-ray apparatus in such situations, the demand for mobile x-ray apparatus is growing and as such there are many commercially available mobile X-ray apparatus offered by a variety of manufacturers.

Commercially available apparatus generally have a large carriage that holds a significant number of heavy lead acid batteries used to power the X-ray tube. Thus, movement of the carriage tends to be awkward due to its large size and heavy weight. Controlled motor drive systems have been used to facilitate movement of the carriage both from the place where the mobile X-ray unit is stored to the location patient in need as well as fine movement often needed to position the X-ray tube over the area of the patient to be radiographed. Examples of such controlled motor drive systems may be found in U.S. Pat. Nos. 4,697,661 and 5,425,069. Whether moving the apparatus forward or backward with the motor control system, it is desirable to have a motor control system that provides the operator with a responsiveness that most nearly simulates the responsiveness of a shopping cart to the operator's touch. Some prior art apparatus may fail to provide simple, inexpensive, reliable and responsive drive systems.

SUMMARY OF THE INVENTION

Accordingly, it is an object of the present invention to provide a motion controlling system for a motorized carriage for transporting equipment, such as that used for taking X-rays, that is simple, inexpensive, reliable and responsive.

It is another object of the present invention to provide a motion controlling system of for a mobile equipment carriage that permits easy assisted movement, steering and stopping of the carriage.

These objects are accomplished, at least in part, by the provision of a motion controlling system for providing a motion control signal to a motor driving a wheel of a medical equipment carriage. The system includes a handle having an end movably supported by the carriage so as to permit movement of the handle end relative to the carriage in a direction in which movement of the apparatus is desired. The system is also provided with an optical position encoding means, coupled between the handle end and the carriage, for providing a position signal indicating the position of the handle end relative to the carriage. A motion control means, responsive to the position signal from the optical position encoding means, provides a motion control signal to the motor.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include.

DETAILED DESCRIPTION OF THE INVENTION

As described hereinafter, the present invention provides a system for controlling the motion of a motorized medical equipment carriage. The present invention is particularly useful for controlling the motion of a heavy mobile X-ray apparatus containing numerous lead acid batteries, and therefore, the invention will be described in the context of a mobile X-ray apparatus. However, those skilled in the art will further appreciate that present invention can also be adapted to control the movement of any motorized equipment carriage or cart.

Figure 1:
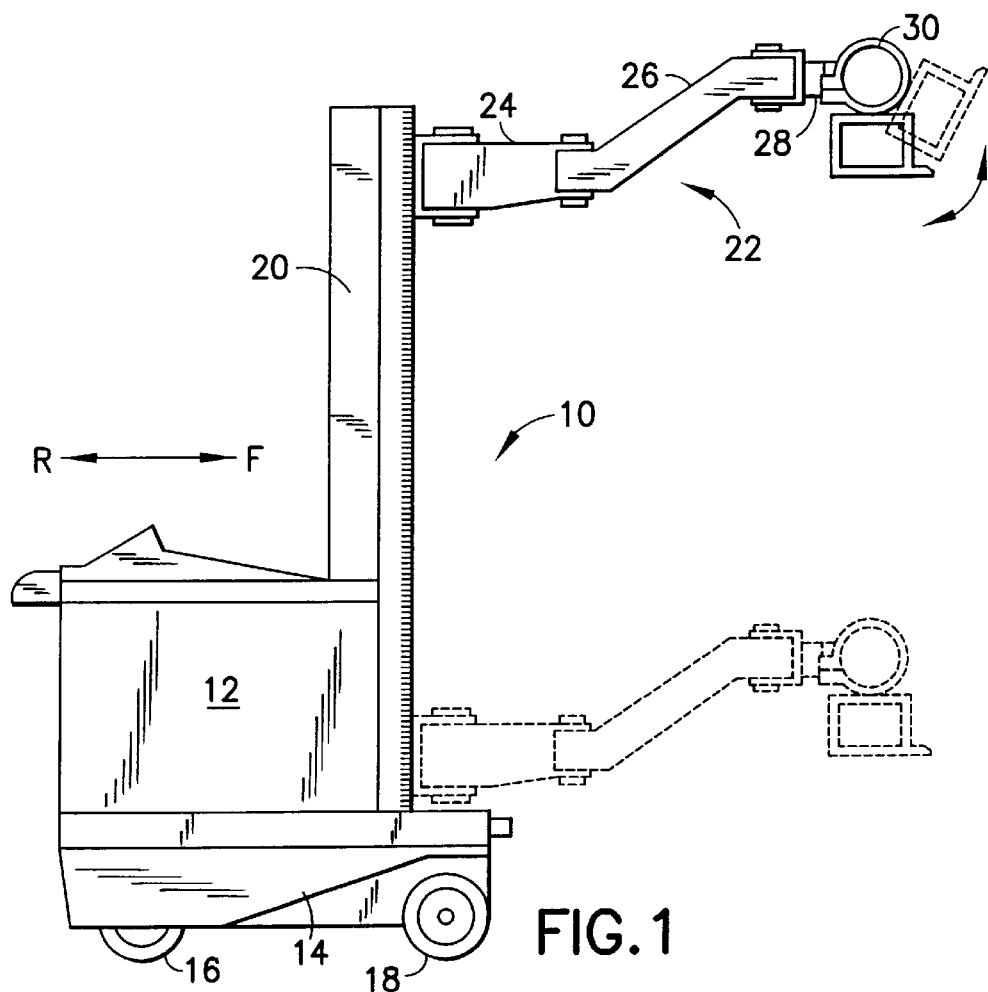
FIG. 1 is a side view of a mobile X-ray apparatus.
Figure 3:
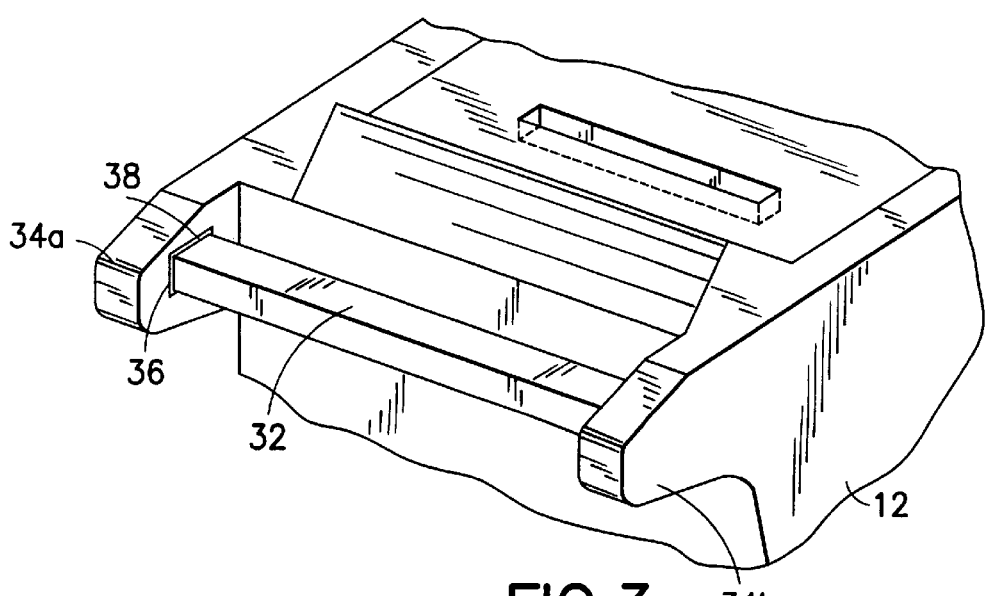
FIG. 3 is a perspective view of a portion of the carriage of the mobile X-ray apparatus further illustrating the motion controlling handle supported between two projections extending from the carriage.
Figure 2:
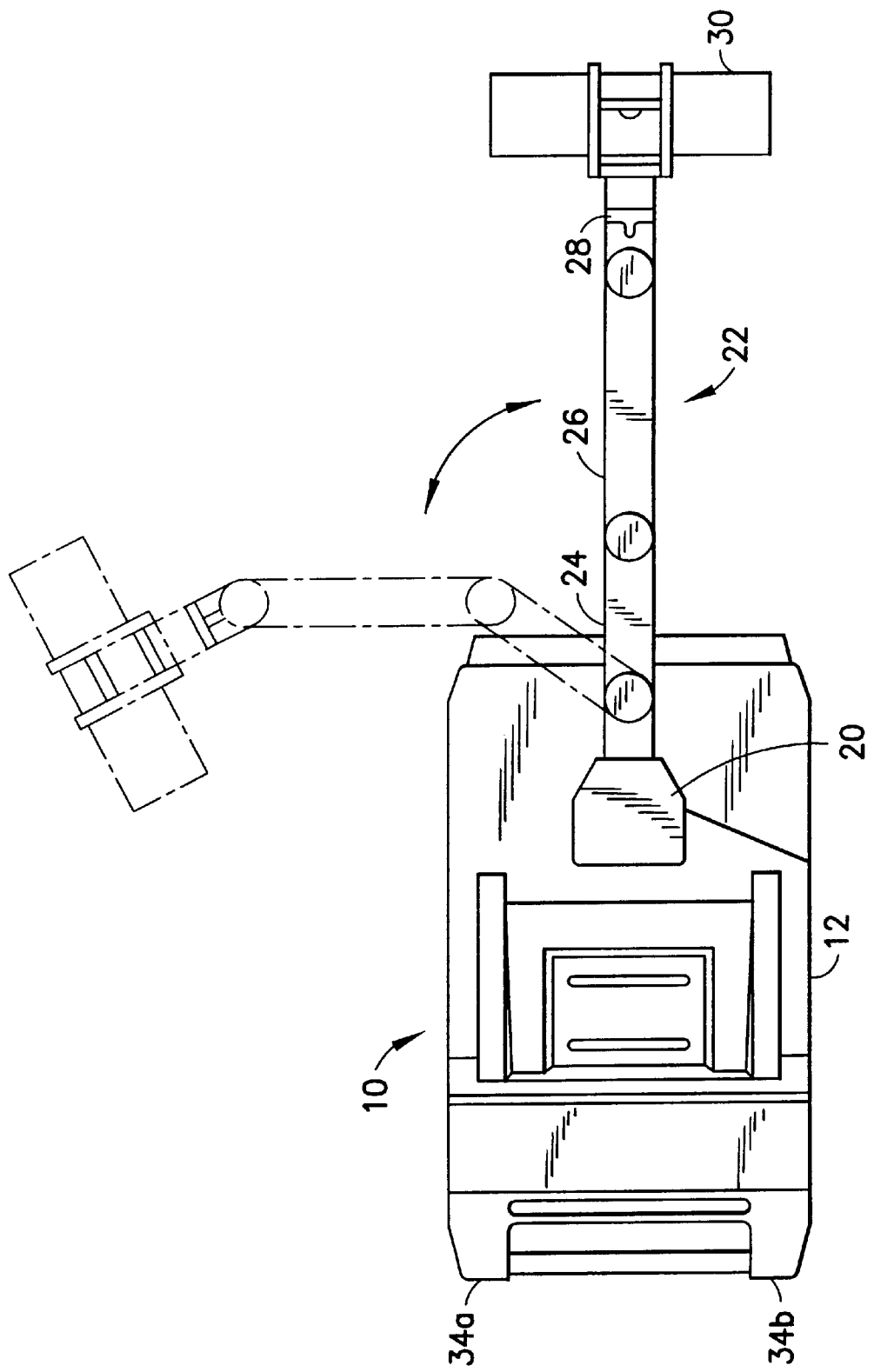
FIG. 2 is a top view of the mobile X-ray apparatus illustrated in FIG. 1.
Figure 4A:
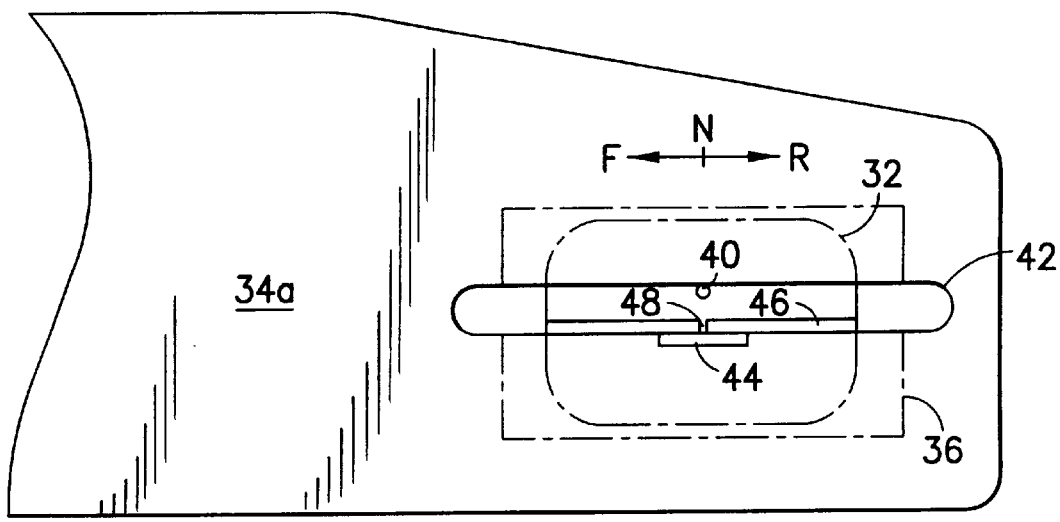
FIGS. 4A and 4B are a pair of schematic side views of one of the carriage projections illustrating the movement of the end of the handle having the attached shade with aperture, relative to the light source and light sensor between a neutral position (FIG. 4A) and a forward position (FIG. 4B)
Figure 4B:
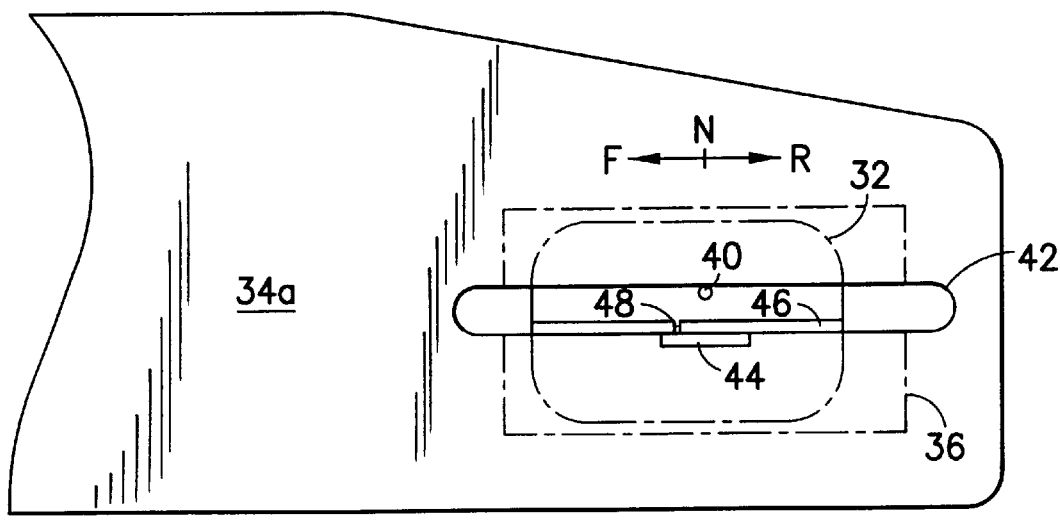
Figure 5A:
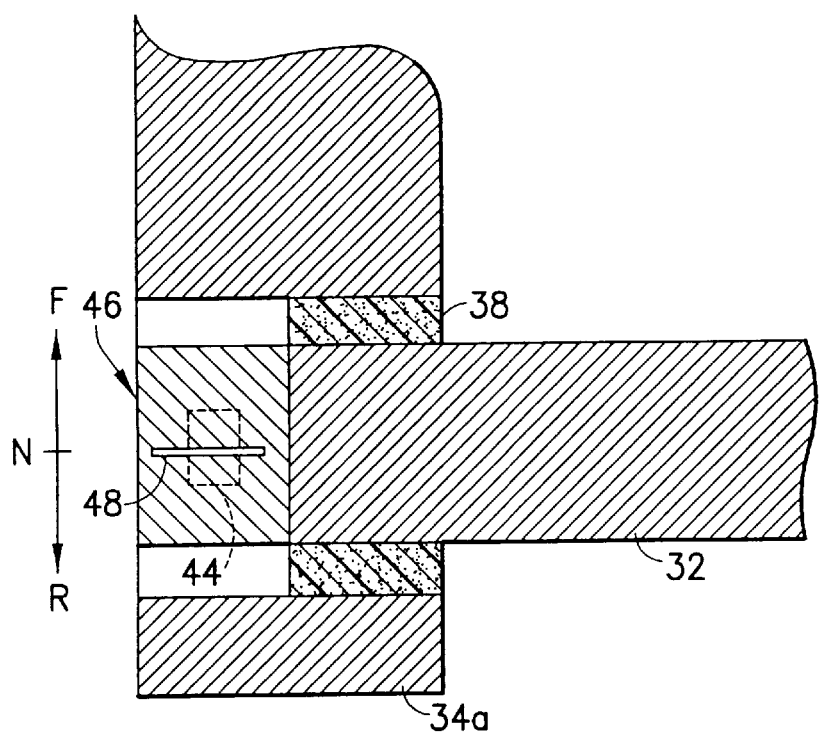
FIGS. 5A and 5B are a pair of schematic cross-sectional views of the carriage projection, the end of the handle with shade and light sensor corresponding to FIGS. 4A and 4B.
Figure 5B:
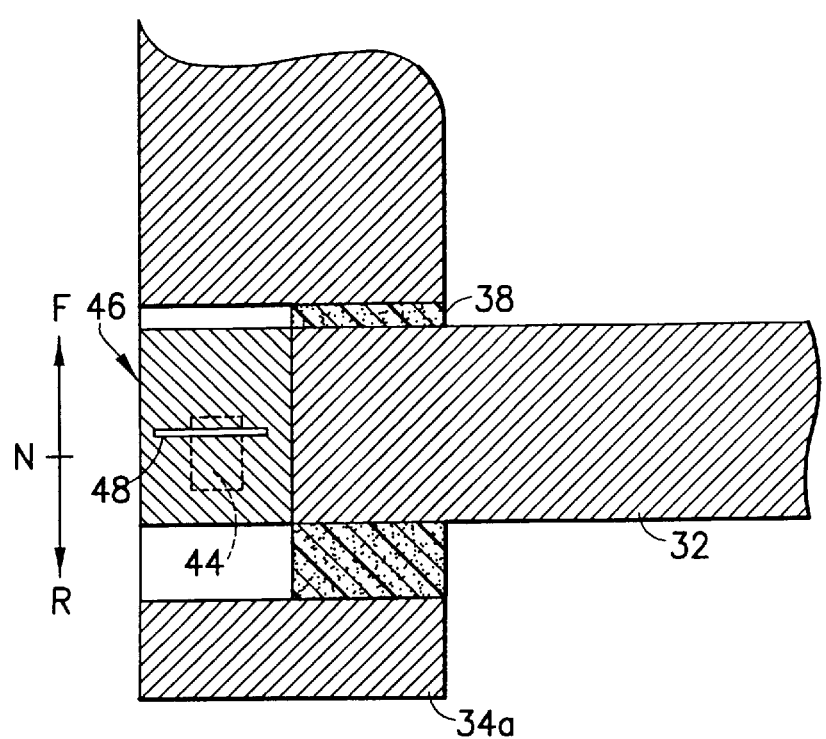

Referring to FIGS. 1 through 3, a typical mobile X-ray unit 10 includes a carriage 12 having a base 14 which is supported from the ground by a pair of rear motor driven wheels 16 and a pair of front wheels 18. A plurality of heavy lead acid batteries (not shown) used to power the X-ray tube are supported by the base. The mobile X-ray unit 10 further includes a mast 20 having an articulating X-ray tube support arm 22 slidably attached thereto. The arm 22 is shown in a fully raised position and is slidable along substantially the entire length of the mast 20 to a fully lowered position as illustrated in phantom. The articulating X-ray tube support arm 22 features a plurality of coupled pivotable support appendages 24, 26, 28 that allow an X-ray tube 30 to be moved in planar motion substantially horizontal to the ground supporting the carriage 12. A detailed description of the mobile X-ray apparatus generally illustrated herein may be found in U.S. Pat. No. 5,425,069, which is incorporated in its entirety herein by reference.

Referring to FIGS. 1 through 5B, the rear motor driven wheels 16 can be independently controlled by the application of forces on a movable handle 32 having ends resiliently supported by and between two projections 34a, 34b extending from the carriage 12. The ends of the handle 32 are movable relative to the projections 34a, 34b, and therefore the carriage 12, in directions in which movement of the X-ray unit 10 is desired, namely forward and reverse. The forward and reverse directions are generally denoted in the figures by a two-headed arrow and the letters F and R.

Each end of the handle 32 can be resiliently supported in the respective projections 34a, 34b by providing each of the projections with a suitably shaped aperture, such as 36 for example, which is larger than the cross-sectional area of the handle end. The resulting gap existing between the aperture 36 and the end of the handle 32 may be filled with an elastomeric material 38 which provides resistance to the movement of the end of handle 32 relative to the carriage projection 34a in both the forward F and reverse R directions. The elastomeric material 38 causes the ends of the handle 32 to return to a neutral position N when a force is not applied thereto. Any elastomeric material or equivalent thereof, such as dense cellular foam, should perform suitably and the physical properties of the particular elastomeric material chosen to fill the gap will ultimately depend upon the resiliency or tactile feedback desired.

The position of the ends of the handle 32 relative to the carriage projections, and hence carriage 12, at any given time determine how each of the motor driven wheels 16 are driven to move the carriage 12. The position of the ends of the handle 32 relative to the carriage 12 may be determined by a pair of optical position encoders coupled between the handle ends and the carriage. Several optical position encoder embodiments that may be used are further described below.

The position of the handle 32 relative to the carriage 12 can be determined by the structure illustrated in FIGS. 4A through 5B, which represents a first embodiment of the optical position encoder. According to this first embodiment, a light source 40, such as a light emitting diode (LED), is affixed within a slot 42 in the projection 34a of the carriage 12. A light sensor 44 is also provided within the slot 42. The light sensor 44 is capable of producing a position signal responsive to at least one characteristic of an illuminated region produced thereon. The characteristics may be the position of the illuminated region, the area of the illuminated region or both. In the embodiment illustrated, the light sensor 44 is preferably formed from a photodiode array, such as Texas Instruments TSL401 or TSL1401 which comprises 128 photodiode pixels arranged linearly. Light energy striking a pixel in the linear array generates a photocurrent, which is then integrated. The amount of charge accumulated at each pixel is directly proportional to the light intensity on that pixel and the integration time. The integration time is the interval between two consecutive output periods. The photodiode array is capable of providing a position signal based upon the position of the illuminated region, the area of the illuminated region or both.

In the embodiment illustrated in FIGS. 4A through 5B, the relative position of the handle 32 is determined by providing the end of the handle 32 with a shade 46. The shade is provided with a slot or aperture 48 therein positioned between the light source 40 and the light sensor 44. The shade 46 is preferably dimensioned to shade the entire light sensor 44 except for the region of the light sensor 44 adjacent to the aperture 48. In this arrangement, light produced by the light source 40 passes through the aperture 48 onto the light sensor 44 to produce the illuminated region on the light sensor 44. In this embodiment, the illuminated region has a relatively constant area, but its position on the light sensor 44 changes with the position of the end of the handle 32 relative to the carriage projection and carriage. Thus, the position of the illuminated region on the light sensor 44 produces a position signal indicative of the relative position of the end of the handle 32.

Figure 6:
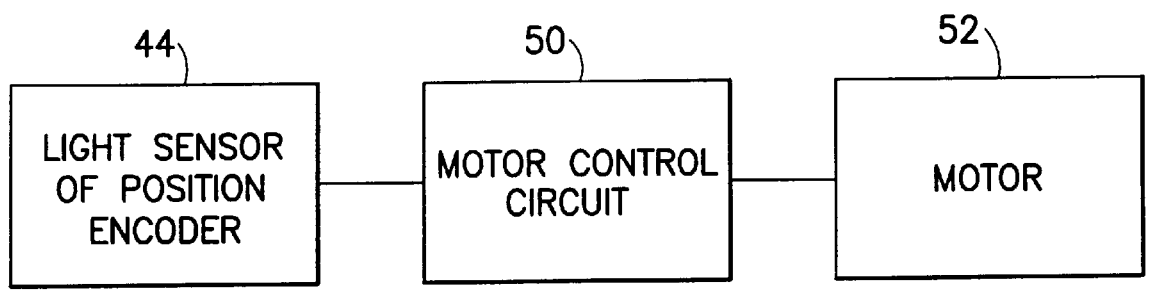
FIG. 6 is a schematic diagram illustrating the interface between the optical position encoder light sensor, the motor driving control circuit and the motor.

Referring to FIG. 6, the position signal from the light sensor 44, which may represent both direction and magnitude from a neutral position, is received by a motor control circuit 50. Based upon the position signal from the light sensor 44, the motor control circuit provides a motion control signal to motor 52 to command the motor 52 to rotate in an appropriate manner to move the carriage 12 in either a forward or reverse direction as well as at a particular velocity in accordance with the position signal.

Figure 7A:
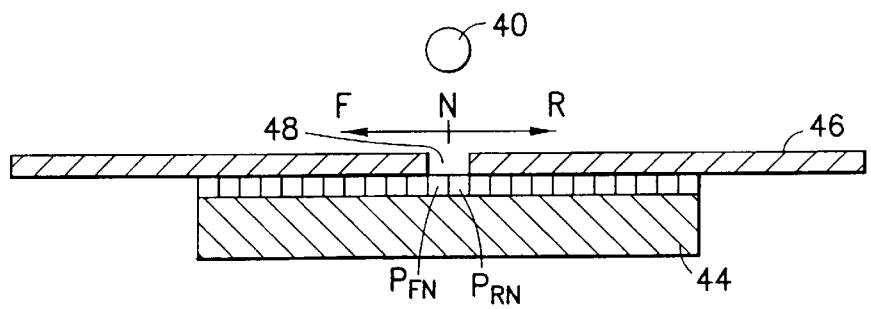
FIGS. 7A through 7D are several schematic cross-sectional views of a first embodiment of the optical position encoder elements illustrating the relative position of the elements when the handle is in various positions relative to the carriage projection.

FIG. 7A is a simple schematic illustration of the light source 40, photodiode array light sensor 44 and shade 46 with aperture 48 therein when the end of the handle 30 is in a neutral position N wherein assisted movement of the carriage 12 is not desired. When in the neutral position, the illuminated region on the light sensor 44 illuminates only photodiode pixels $P_{FN}$ and $P_{RN}$. A photocurrent charge stored in these pixels represents a neutral position on the photodiode array. In this case, integration of all of the pixels of the photodiode array reveals that pixels $P_{FN}$ and $P_{RN}$ contain charge while the remaining pixels do not. Based upon the integration results, the light sensor produces a neutral position signal through appropriate signal processing, because photocurrent is only present in the neutral pixels $P_{FN}$ and $P_{RN}$. The motor control circuit 50, which is responsive to the position signal from the light sensor 44, provides no signal to the motor 52 to cause it to move.

Figure 7B:
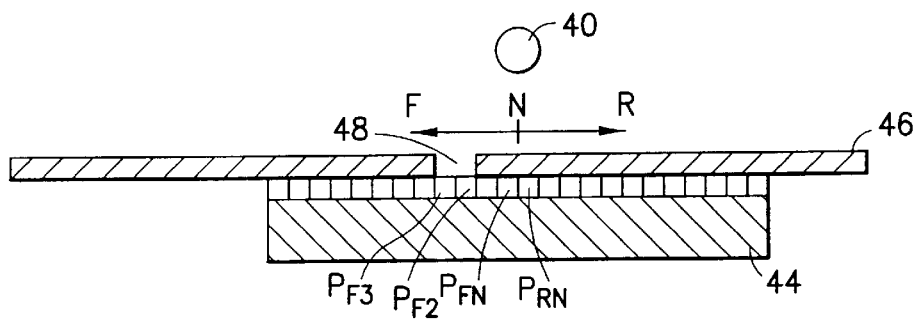

FIG. 7B illustrates the position of the light source 40, the photodiode array light sensor 44 and shade 46 with aperture 48 when the end of the handle 32 is pushed in the forward direction F towards the carriage 12. In this case, the illuminated region on the light sensor 44 illuminates photodiode pixels $P_{F2}$ and $P_{F3}$, for example. Integration of the photodiode pixels in the array causes the light sensor to produce a forward position signal of a predetermined magnitude corresponding to the photocurrent being present in only pixels $P_{F2}$ and $P_{F3}$. Through calibration of the encoder, such pixels can indicate the end of the handle 32 has been pushed towards the carriage 12 a predetermined amount. Thus, based upon the resulting forward position signal from the light sensor 44, the motor control circuit 50 provides a signal to the motor 52 to cause it to rotate in a manner that provides forward motion of the carriage at a velocity corresponding to the relative position of the end of the handle 32 to the carriage 12 as determined by the photodiode array described above.

Figure 7C:
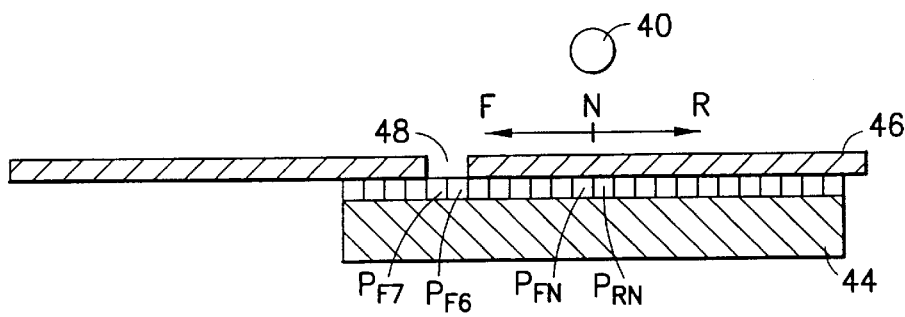

FIG. 7C illustrates the position of the light source 40, the photodiode array light sensor 44 and shade 46 with aperture 48 when the end of the handle 32 is pushed in the forward direction F towards the carriage 12 to a greater degree than that illustrated in FIG. 7B. In this illustration, the illuminated region falls on photodiode pixels $P_{F6}$ and $P_{F7}$. Upon integration, the photocurrent present only in such pixels results in a forward position signal produced by the light sensor 44 having a greater magnitude than the position signal produced by the system in the FIG. 7B, thereby indicating that the end of the handle 32 has been pushed closer towards the carriage 12 in the forward direction F. Based upon the resulting forward position signal with greater magnitude from the light sensor 44, the motor control circuit 50 provides a signal to the motor 52 to cause it to rotate in a manner to drive the carriage 12 in the forward direction F at a higher velocity than in the case illustrated in FIG. 7B.

Figure 7D:
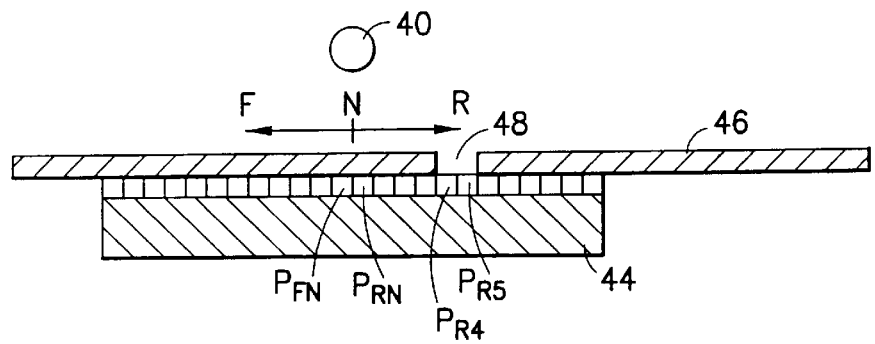

FIG. 7D illustrates the position of the light source 40, the photodiode array light sensor 44 and shade 46 with aperture 48 when the end of the handle 32 is pulled in the reverse direction R, away from the carriage 12. In this illustration, the illuminated region falls on photodiode pixels $P_{R4}$ and $P_{R5}$. The photocurrent present only in these photodiode pixels, upon integration, causes a resultant reverse position signal of a certain magnitude to be produced by the light sensor 44, thereby indicating that the end of the handle 32 has been pulled away from the carriage 12 in the reverse direction R. Based upon the resulting reverse position signal from the light sensor 44, the motor control circuit 50 provides a signal to the motor 52 to cause it to rotate in a manner that provides motion of the carriage 12 in the reverse direction R at a prescribed velocity.

FIGS. 8A through 8D illustrate a second embodiment of an optical position encoder that may be used to determine the position of the handle end relative to the carriage. In this embodiment, the light source 40 is attached to the end of the handle 32. In this embodiment, the light source 40 is focused on the light sensor 44 to produce an illuminated region thereon of a predetermined area. Lasers, optical fibers or a lens based light system may provide the focused light of light source 40.

Figure 8A:
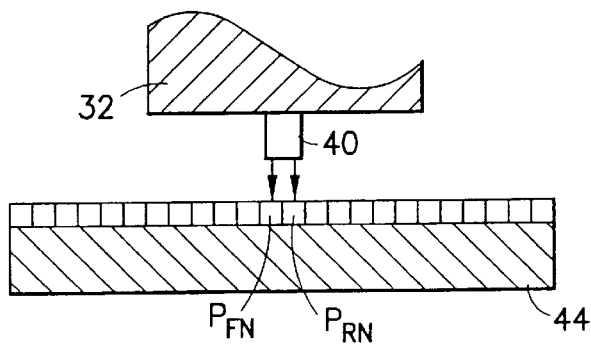
FIGS. 8A through 8D are several schematic cross-sectional views of a second embodiment of the optical position encoder elements illustrating the relative position of the elements when the handle is in various positions relative to the carriage projection.

Now, more particularly, FIG. 8A represents a simple schematic illustration of the light source 40 and photodiode array light sensor 44 when the end of the handle 32 is in a neutral position N wherein assisted movement of the carriage 12 is not desired, similar to that illustrated in FIG. 7A. When in the neutral position, the illuminated region caused by the focused light from light source on the light sensor 44 illuminates only neutral photodiode pixels $P_{FN}$ and $P_{RN}$. As described above with respect to the first embodiment, integration of all of the pixels of the photodiode array causes the light sensor to produce a neutral position signal indicating that the end of the handle 32 is in the neutral position N relative to the carriage 12. The motor control circuit 50, which is responsive to the neutral position signal from the light sensor 44, provides no signal to the motor 52 to cause it to move.

Figure 8B:
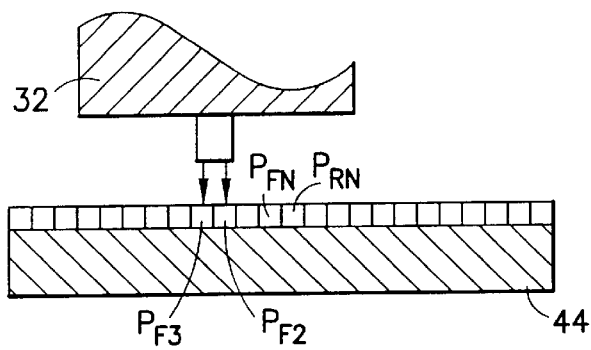

FIG. 8B illustrates the position of the light source 40 and the photodiode array light sensor 44 when the end of the handle 32 is pushed in the forward direction F towards the carriage 12. In this case, the illuminated region on the light sensor 44 illuminates photodiode only pixels $P_{F2}$ and $P_{F3}$, for example. Again, as in the first embodiment described above, integration of the photodiode pixels in the array causes the light sensor to produce a forward position signal of a magnitude corresponding to the degree that the end of the handle 32 has been pushed towards the carriage 12. Based upon the forward position signal from the light sensor 44, the motor control circuit 50 provides a signal to the motor 52 to cause it to rotate in a manner that provides forward motion at a velocity corresponding to relative position of the end of the handle 32 to the carriage 12 determined by the photodiode array as described above.

Figure 8C:
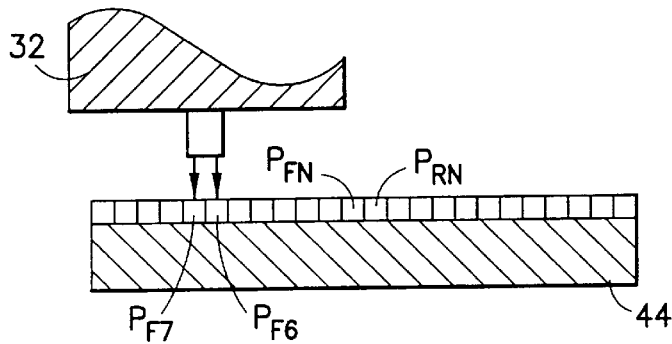

FIG. 8C illustrates the position of the light source 40 and the photodiode array light sensor 44 when the end of the handle 32 is pushed in the forward direction F towards the carriage 12 to a greater degree than that illustrated in FIG. 8B. In this illustration, similar to FIG. 7C, the illuminated region falls only on photodiode pixels $P_{F6}$ and $P_{F7}$. Illumination of such pixels results in a forward position signal, after integration of the photodiode array, produced by the light sensor 44 having a greater magnitude, thereby indicating that the end of the handle 32 has been pushed closer towards the carriage 12 in the forward direction F. Based upon the forward position signal from the light sensor 44, the motor control circuit 50 provides a signal to the motor 52 to cause it to rotate in a manner that provides motion of the carriage 12 in the forward direction F at a higher velocity than in the case illustrated in FIG. 8B.

Figure 8D:
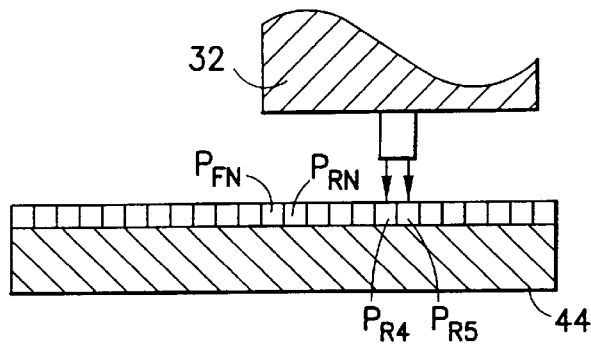

FIG. 8D illustrates the position of the light source 40 and the photodiode array light sensor 44 when the end of the handle 32 is pulled in the reverse direction R, away from the carriage 12. In this illustration, similar to FIG. 7D, the illuminated region falls on photodiode pixels $P_{R4}$ and $P_{R5}$. The photocurrent present only in these photodiode pixels causes a resultant reverse position signal with a predetermined magnitude, after integration, to be produced by the light sensor 44 indicating that the end of the handle 32 has been pulled away from the carriage 12 in the reverse direction R. Based upon the reverse position signal from the light sensor 44, the motor control circuit 50 provides a signal to the motor 52 to cause it to rotate in a manner that provides motion of the carriage 12 in the reverse direction R at a prescribed velocity.

FIGS. 9A through 9D illustrate a third embodiment of an optical position encoder that may be used to determine the relative position of the handle end. In this embodiment, the light source 40 is attached to the carriage 12 in the same manner as described for the embodiment illustrated in FIGS. 4A through 5B and 7A through 7D. However, this embodiment differs from that illustrated in FIGS. 4A through 5B, and 7A through 7D in that the shade 46, attached to the end of the handle 32 is not provided with an aperture. Instead of providing an illuminated region on the light sensor 44 that has a substantially constant area but changes position, in this embodiment the illuminated region on the light sensor changes in both area and position as illustrated.

Figure 9A:
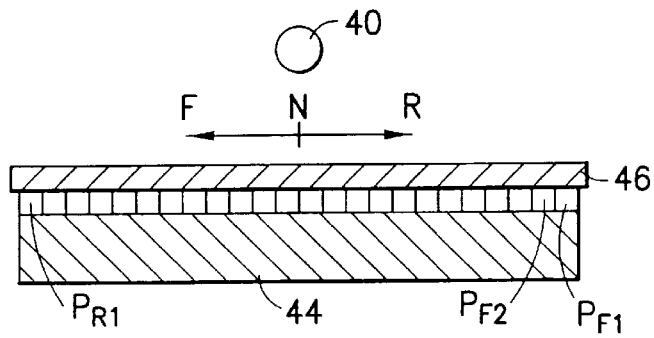
FIGS. 9A through 9D are several schematic cross-sectional views of a third embodiment of the optical position encoder elements illustrating the relative position of the elements when the handle is in various positions relative to the carriage projection.

More particularly, FIG. 9A is a simple schematic illustration of the light source 40 and photodiode array light sensor 44 when the end of the handle 32 is in a neutral position N wherein assisted movement of the carriage 12 is not desired, similar to that illustrated in FIGS. 7A and 8A. When in the neutral position, all of the pixels of the photodiode array are shaded by shade 46. Integration of all of the pixels of the photodiode array causes the light sensor to produce a neutral position signal indicating that the end of the handle 32 is in the neutral position N relative to the carriage 12 because no photocurrent is present in any photodiode pixel. The motor control circuit 50, which is responsive to the neutral position signal from the light sensor 44, provides no signal to the motor 52 to cause it to move.

Figure 9B:
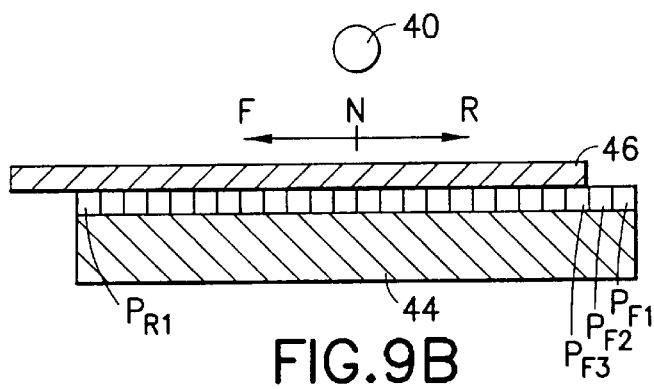

FIG. 9B illustrates the position of the light source 40, shade 46 and the photodiode array light sensor 44 when the end of the handle 32 is pushed in the forward direction F towards the carriage 12, similar to that illustrated in FIGS. 7B and 8B. In this case, the illuminated region on the light sensor 44 illuminates photodiode pixels $P_{F1}$ and $P_{F2}$, which are located at the edge of the photodiode array; not in the middle region, as in the previously described embodiments. Again, as in the other embodiments described above, upon integration of the array, the detected photocurrent present in these photodiode pixels in the array causes the light sensor 44 to produce a forward position signal of a predetermined magnitude corresponding to the position of the end of the handle 32 relative to the carriage 12. Based upon the forward position signal from the light sensor 44, the motor control circuit 50 provides a signal to the motor 52 to cause it to rotate in a manner that provides forward motion at a velocity corresponding to the relative position of the end of the handle 32.

Figure 9C:
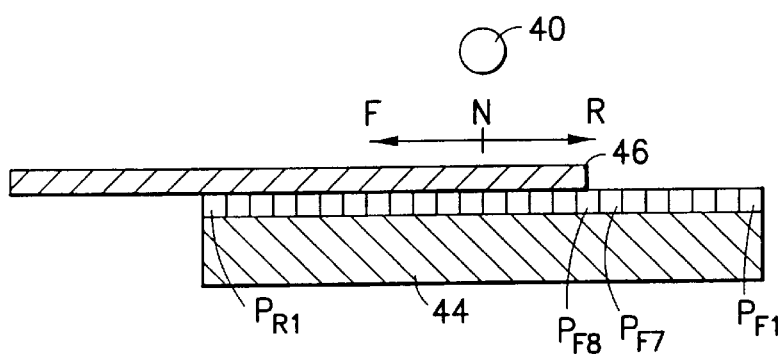

FIG. 9C illustrates the position of the light source 40 and the photodiode array light sensor 44 when the end of the handle 32 is pushed in the forward direction F towards the carriage 12 to a greater degree than that illustrated in FIG. 8B. In contrast to FIGS. 7C and 8C, the resulting illuminated region illuminates a greater number of photodiode pixels from the edge of the array inward, namely pixels $P_{F1}$ through $P_{F8}$. The photocurrent present in such pixels results in a forward position signal of a greater magnitude than that of FIG. 9B, after integration of the photodiode array, indicating that the end of the handle 32 has been pushed closer towards the carriage 12 in the forward direction F. Based upon the forward position signal from the light sensor 44, the motor control circuit 50 provides a signal to the motor 52 to cause it to rotate in a manner that provides motion of the carriage 12 in the forward direction F at a higher velocity than in the case illustrated in FIG. 7B.

Figure 9D:
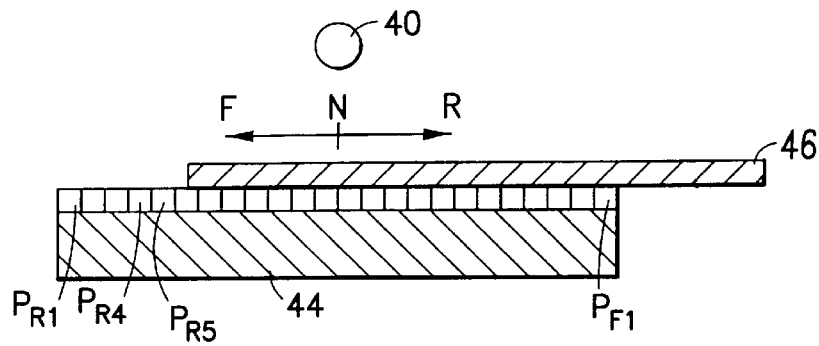

FIG. 9D illustrates the position of the light source 40 and the photodiode array light sensor 44 when the end of the handle 32 is pulled in the reverse direction R, away from the carriage 12. In contrast to FIGS. 7D and 8D, the illuminated region illuminates pixels on the photodiode from the other edge of the array inward, namely pixels $P_{R1}$ through $P_{R5}$. The photocurrent present in these photodiode pixels causes a resultant reverse position signal of a predetermined magnitude, after integration, to be produced by the light sensor 44 indicating that the end of the handle 32 has been pulled away from the carriage 12 in the reverse direction R. Based upon the reverse position signal from the light sensor 44, the motor control circuit 50 provides a signal to the motor 52 to cause it to rotate in a manner that provides motion of the carriage 12 in the reverse direction R at a prescribed velocity.

FIGS. 10A through 10D illustrate a fourth embodiment of an optical position encoder that may be used to determine the relative position of the handle. This embodiment is similar in some respects to the third embodiment described above. In this embodiment, the light source 40 is attached to the carriage 12 in the same manner. However, the difference is that the light sensor 44 is formed by a pair of solar cells $C_F$, $C_R$ rather than by a photodiode array. Those skilled in the art will appreciate that the current output of a solar cell increases proportionally to the quantity of light energy it receives. In a multidirectional system as illustrated, the current produced by solar cell $C_F$ provides a forward position signal while the current produced by solar cell $C_R$ provides a reverse position signal. The resulting current signals from the solar cells may be combined or compared in any well known manner to provide a single signal constituting the position signal from the light sensor 44. Similar to the third embodiment, the shade 46 is attached to the end of the handle 32 and is not provided with an aperture. In this forth embodiment, when the end of the handle 32 is moved relative to the carriage 12, both the area and position characteristics of the illuminated region on the light sensor 44 change, as illustrated.

Figure 10A:
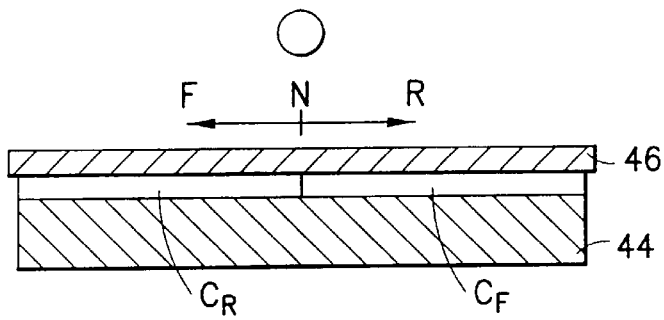
FIGS. 10A through 10D are several schematic cross-sectional views of a fourth embodiment of the optical position encoder elements illustrating the relative position of the elements when the handle is in various positions relative to the carriage projection.

FIG. 10A is a simple schematic illustration of the light source 40 and light sensor 44 formed from the pair of solar cells $C_F$, $C_R$ when the end of the handle 32 is in a neutral position N wherein assisted movement of the carriage 12 is not desired, similar to that illustrated in FIGS. 7A, 8A and 9A. When in the neutral position, both solar cells $C_F$, $C_R$ are shaded by shade 46, no current signal results from either solar cell. No current from either cell results in a neutral position signal provided by the light sensor 44. The neutral position signal from the light sensor 44 is interpreted to mean that the end of the handle 32 is in the neutral position N relative to the carriage 12. The motor control circuit 50, which is responsive to position signals from the light sensor 44, provides no signal to the motor 52 to cause it to move.

Figure 10B:
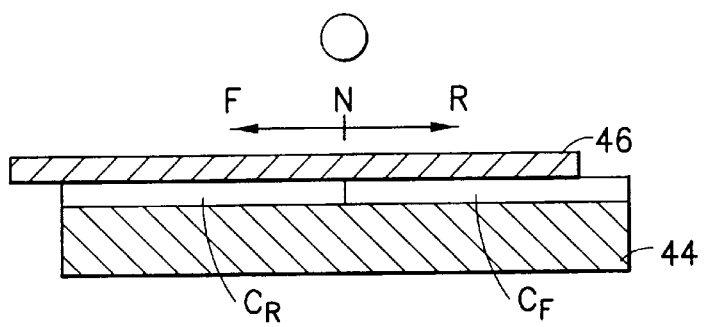

FIG. 10B illustrates the position of the light source 40, shade 46 and the solar cell light sensor 44 when the end of the handle 32 is pushed in the forward direction F towards the carriage 12, similar to that illustrated in FIGS. 7B, 8B and 9B. In this case, the illuminated region on the light sensor 44 partially illuminates solar cell $C_F$, while solar cell $C_R$ remains shaded. The corresponding current output from solar cell $C_F$ constitutes the forward position signal output of the light sensor 44. As will be appreciated by those skilled in the art, the current signal coming from the solar cell $C_F$ may be calibrated to indicate the relative position of the handle end. Based upon the magnitude of the forward position signal from the light sensor 44, the motor control circuit 50 provides a signal to the motor 52 to cause it to rotate in a manner that provides forward motion at a velocity corresponding to relative position of the end of the handle 32 to the carriage 12 determined by the solar cells.

Figure 10C:
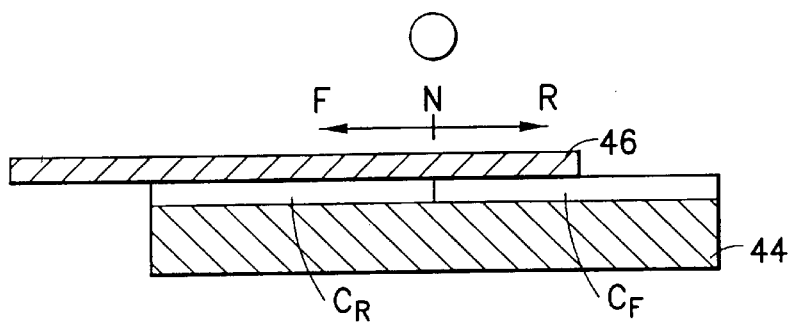

FIG. 10C illustrates the position of the light source 40 and the light sensor 44 when the end of the handle 32 is pushed in the forward direction F towards the carriage 12 to a greater degree than that illustrated in FIG. 10B. In comparison to FIG. 10B, the area of the illuminated region on the solar cell $C_F$ is now greater, the light energy received by the solar cell is higher and therefore the resulting current signal from it has a greater magnitude. Thus the position signal from light sensor 44 has greater magnitude than the position signal resulting from the conditions illustrated in FIG. 10B. Based upon the forward position signal from the light sensor 44 which has a higher magnitude, the motor control circuit 50 provides a signal to the motor 52 to cause it to rotate in a manner that provides motion of the carriage 12 in the forward direction F at a higher velocity than in the case illustrated in FIG. 10B.

Figure 10D:
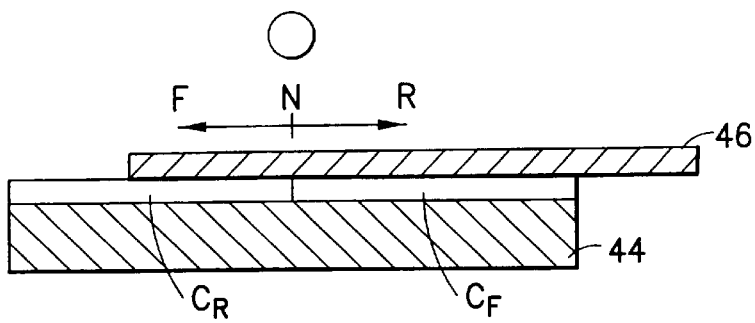

FIG. 10D illustrates the position of the light source 40 and the solar cell light sensor 44 when the end of the handle 32 is pulled in the reverse direction R, away from the carriage 12. In this situation, solar cell $C_R$ is illuminated and solar cell $C_F$ is shaded. The area of the illuminated region on solar cell $C_R$ causes current to flow from it, resulting in a reverse position signal of a certain magnitude to be produced by the light sensor 44. Upon calibration, the magnitude of the current signal from solar cell $C_R$, which is dependent upon the area of the illuminated region, can be used to indicate that the end of the handle 32 has been pulled away from the carriage 12 in the reverse direction R by a predetermined amount. Based upon the magnitude of the reverse position signal from the light sensor 44, the motor control circuit 50 provides a signal to the motor 52 to cause it to rotate in a manner that provides motion of the carriage 12 in the reverse direction R at a prescribed velocity.

While the above embodiments have been described with respect to one end of the handle 32, it should be apparent to those skilled in the art that the above embodiments may be applied to both ends of the handle 32. Accordingly, when such is the case, two motor driven wheels 16 may be controlled such that the carriage 12 can be steered and maneuvered very effectively with little effort. For example, by pushing the end of the handle 32 held by projection 34a to cause forward rotation of one wheel, while pulling on the end of the handle 32 held by projection 34b to cause reverse rotation of the other wheel, the carriage 12 can nearly be pivoted about. Pushing on one end of the handle 32 harder than the other results in steerage of the carriage 12 as one would ordinarily expect.

Although the present invention has been described with respect to one or more particular embodiments of the apparatus, it will be understood that variations and other embodiments of the present invention may be made without departing from the spirit and scope of the present invention. For example, the positions of the light sensor, light source and shade may be reversed or altered from that described without deviating from the present invention. Hence, the present invention is deemed limited only by the appended claims and the reasonable interpretation thereof.

What is claimed is:

1. A motion control system for providing a motion control signal to a motor driving a wheel of a medical equipment carriage, the motion control system comprising:
    a handle having an end movably supported by the carriage so as to permit movement of the handle end relative to the carriage in a direction in which movement of the carriage is desired;
    an optical position encoding means, coupled between the handle end and the carriage, providing a handle position signal indicating the position of the handle end relative to the carriage;
    motion control means, responsive to the handle position signal from the optical position encoding means, providing the motion control signal to the motor,
    wherein the optical position encoding means comprises a photodiode array.

2. A motion control system for providing a motion control signal to a motor driving a wheel of a medical equipment carriage, the motion control system comprising:
    a handle having an end movably supported by the carriage so as to permit movement of the handle end relative to the carriage in a direction in which movement of the carriage is desired;
    an optical position encoding means, coupled between the handle end and the carriage, providing a handle position signal indicating the position of the handle end relative to the carriage;
    motion control means, responsive to the handle position signal from the optical position encoding means, providing the motion control signal to the motor,
    wherein the optical position encoding means comprises a light sensor, attached to the carriage, producing the handle position signal responsive to at least one characteristic of an illuminated region on the light sensor,
    wherein the optical position encoding means further comprises an illuminated region providing means, attached to the handle, providing an illuminated region on the light sensor having at least one characteristic that changes in response to the movement of the handle end relative to the carriage,
    wherein a light source is attached to the carriage,
    wherein the illuminated region providing means comprises a shade positioned between the light source and the light sensor, and
    wherein the at least one characteristic of the illuminated region that changes in response to the movement of the handle end relative to the carriage is the area of the illuminated region on the light sensor.

3. The system of claim 2, wherein the light sensor is a photodiode array.

4. The system of claim 2, wherein the light sensor has a solar cell.

5. A motion control system for providing a motion control signal to a motor driving a wheel of a medical equipment carriage, the control system comprising:
    a handle having an end movably supported by the carriage so as to permit movement of the handle end relative to the carriage in a direction in which movement of the carriage is desired;
    an optical position encoding means, coupled between the handle end and the carriage, providing a handle position signal indicating the position of the handle end relative to the carriage;
    motion control means, responsive to the handle position signal from the optical position encoding means, providing the motion control signal to the motor,
    wherein the optical position encoding means comprises a light sensor, attached to the carriage, producing the handle position signal responsive to at least one characteristic of an illuminated region on the light sensor,
    wherein the optical position encoding means further comprises an illuminated region providing means, attached to the handle, providing an illuminated region on the light sensor having at least one characteristic that changes in response to the movement of the handle end relative to the carriage,
    wherein the light sensor comprises a photodiode array,
    wherein the illuminated region providing means comprises a light source focused on the light sensor, and
    wherein the at least one characteristic of the illuminated region that changes in response to the movement of the handle end relative to the carriage is the position of the illuminated region on the light sensor.

6. A motion control system for providing a motion control signal to a motor driving a wheel of a medical equipment carriage, the control system comprising:
    a handle having an end movably supported by the carriage so as to permit movement of the handle end relative to the carriage in a direction in which movement of the carriage is desired;
    an optical position encoding means, coupled between the handle end and the carriage, providing a handle position signal indicating the position of the handle end relative to the carriage;
    motion control means, responsive to the handle position signal from the optical position encoding means, providing the motion control signal to the motor,
    wherein the optical position encoding means comprises a light sensor, attached to the carriage, producing the handle position signal responsive to at least one characteristic of an illuminated region on the light sensor, wherein the optical position encoding means further comprises an illuminated region providing means, attached to the handle, providing an illuminated region on the light sensor having at least one characteristic that changes in response to the movement of the handle end relative to the carriage, wherein a light source is attached to the carriage, wherein the light sensor comprises a photodiode array, wherein the illuminated region providing means comprises a shade, positioned between the light source and the light sensor, having an aperture therein through which light from the light source passes through to create the illuminated region, and wherein the at least one characteristic of the illuminated region that changes in response to the movement of the handle end relative to the carriage is the position of the illuminated region on the light sensor.

7. A motion control system for providing a pair of motion control signals to a pair of motors driving two wheels of a medical equipment carriage, the combination comprising:

a medical equipment carriage;

an elongated handle having first and second ends movably supported by the carriage so as to permit movement of the handle ends relative to the carriage in a direction in which movement of the carriage is desired;

a first optical position encoding means, coupled between the first handle end and the carriage, for providing a first position signal indicating the position of the first handle end relative to the carriage;

first motion control means, responsive to the first position signal from the first optical position encoding means, providing a first motion control signal to a first motor;

a second optical position encoding means, coupled between the second handle end and the carriage, for providing a second position signal indicating the position of the second handle end relative to the carriage; and second motion control means, responsive to the second position signal from the second optical position encoding means, providing a second motion control signal to a second motor, such that the two wheels are separately controlled thereby steering, maneuvering, and pivoting the carriage about a vertical axis.

8. The system of claim 7, wherein the handle ends are also resiliently supported.

9. A motion control system the combination comprising:

a medical equipment carriage;

a handle movably attached to the carriage;

an optical position encoder having a photodiode array with pixels or cells and having a light source providing light, the light source being slidably arranged with respect to the photodiode array, the optical position encoder being responsive to relative movement between the carriage and the handle, and the optical position encoder providing an optical position encoder signal containing information to control the movement of the carriage depending on the light received by the pixels or cells in the photodiode array.

10. A motion control systems the combination comprising:

a medical equipment carriage;

a handle movably attached to the carriage;

a shade; and an optical position encoder having an illuminated region with pixels or cells and having an optical source providing light, the shade being slidably arranged with respect to the illuminated region, the optical position encoder being responsive to relative movement between the carriage and handle, and the optical position encoder providing an optical position encoder signal containing information to control the movement of the carriage depending on the light received by the pixels or cells in the illuminated region.

11. A motion control system the combination comprising:

a medical equipment carriage;

a handle movably attached to the carriage;

a shade having an aperture; and an optical position encoder having an illuminated region with pixels or cells and having an optical source providing light, the shade being slidably arranged with respect to the illuminated region, the optical position encoder being responsive to relative movement between the carriage and handle, and the optical position encoder providing an optical position encoder signal containing information to control the movement of the carriage depending on the light received by the pixels or cells in the illuminated region.

* * * * *